(12) United States Patent
Goodsitt et al.

(10) Patent No.: US 11,410,158 B2
(45) Date of Patent: *Aug. 9, 2022

(54) PAYMENT CARD WITH USER FEEDBACK

(71) Applicant: Capital One Services, LLC, McLean, VA (US)

(72) Inventors: Jeremy Goodsitt, Champaign, IL (US); Austin Walters, Savoy, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,911

(22) Filed: Jul. 2, 2021

(65) Prior Publication Data

US 2021/0342820 A1     Nov. 4, 2021

Related U.S. Application Data

(63) Continuation of application No. 16/862,749, filed on Apr. 30, 2020, now Pat. No. 11,055,700.

(51) Int. Cl.
*G06K 5/00*     (2006.01)
*G06Q 20/34*     (2012.01)
*G06F 3/01*     (2006.01)
*G06Q 20/40*     (2012.01)

(52) U.S. Cl.
CPC .......... *G06Q 20/357* (2013.01); *G06F 3/016* (2013.01); *G06Q 20/40155* (2020.05)

(58) Field of Classification Search
CPC .... G06Q 10/02; G06Q 10/047; G06Q 10/503; G08G 1/202
USPC ................ 235/380, 382, 487, 492
See application file for complete search history.

(56) References Cited

U.S. PATENT DOCUMENTS

| | | |
|---|---|---|
| 6,325,284 B1 | 12/2001 | Walker et al. |
| 9,065,893 B2 | 6/2015 | Glaser |
| 9,928,696 B2 | 3/2018 | Levesque et al. |
| 11,055,700 B1 * | 7/2021 | Goodsitt ................ G06F 3/016 |
| 2003/0233278 A1 | 12/2003 | Marshall |
| 2013/0217333 A1 | 8/2013 | Sprigg et al. |
| 2014/0183269 A1 * | 7/2014 | Glaser ................ G06Q 20/1085 235/492 |
| 2016/0358167 A1 * | 12/2016 | Van Os .............. G06Q 30/0226 |
| 2017/0123498 A1 | 5/2017 | Dillon, Jr. et al. |
| 2018/0018704 A1 | 1/2018 | Tunnell et al. |

FOREIGN PATENT DOCUMENTS

WO     2010137901 A2     12/2010

* cited by examiner

*Primary Examiner* — Daniel St Cyr
(74) *Attorney, Agent, or Firm* — Banner & Witcoff, Ltd.

(57) ABSTRACT

Aspects described herein may allow for method of detecting when a payment card is in a retail establishment by establishing communication between the payment card and a real-time position tracking system; determining whether one of a plurality of accounts linked to the payment card has been used in one or more prior purchasing transactions in the retail establishment; detecting, movement of the payment card with respect to the individual carrying the payment card while the payment card is in a carrying device carried by the individual; and providing, by the payment card, haptic feedback and visible feedback to the individual carrying the payment card.

20 Claims, 7 Drawing Sheets

PAYMENT CARD WITH USER FEEDBACK

CROSS-REFERENCE TO RELATED APPLICATIONS

The instant application is a continuation of U.S. patent application Ser. No. 16/862,749, titled "PAYMENT CARD WITH USER FEEDBACK" filed Apr. 30, 2020, the disclosure of which is hereby incorporated by reference in its entirety.

FIELD OF USE

Aspects of the disclosure relate generally to a payment card that provides user feedback. More specifically, aspects of the disclosure may provide for enhanced systems for detecting when a payment card is in a retail establishment and providing feedback on the card to an individual indicating that prior purchases have been made in that establishment with the card.

BACKGROUND

Individuals may carry multiple payment cards, such as credit cards and debit cards, for example, and oftentimes keep the payment cards in a wallet or a purse. Many of the payment cards carried by an individual offer benefits or rewards for use of the card, and some benefits and rewards may be obtained when a particular payment card is used at a particular retail establishment, store, merchant or service provider. Retail establishments may also offer incentives to individuals when a particular payment card is used for a purchasing transaction in that retail establishment. When an individual carries a large number of payment cards, it may be hard to keep track of which card may need to be used in a particular retail establishment in order to obtain an available reward or benefit. Tracking which of the individual's payment cards has been used for prior purchasing transactions in a particular retail establishment can be problematic.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for identifying when a payment card is in a retail establishment, and providing an indication to the user that this particular payment card has been used previously in the retail establishment, thereby allowing the user to take advantage of reward and benefit programs.

In accordance with certain aspects, a computer-implemented method includes detecting when a payment card is in a retail establishment by establishing communication between the payment card and a real-time position tracking system in a smartphone carried by an individual carrying the payment card; determining whether one of a plurality of accounts linked to the payment card has been used in one or more prior purchasing transactions in the retail establishment by establishing communication between the payment card and a processor containing a database of prior purchasing transactions; detecting, by a motion detecting sensor embedded in the payment card, movement of the payment card with respect to the individual carrying the payment card while the payment card is in a carrying device carried by the individual; and providing, by the payment card, haptic feedback and visible feedback to the individual carrying the payment card, wherein the visible feedback comprises illuminating one of a plurality of lights positioned proximate at least one peripheral edge of the payment card, the one of a plurality of lights being associated with the one of a plurality of accounts.

In accordance with other aspects, a system includes a payment card including a haptic feedback mechanism, a plurality of lights proximate a peripheral edge of the payment card, each of the lights being associated with one of a plurality of accounts to which the payment card is linked and having a color or location on the card different than the color or location of each of the remaining lights on the card, and a sensor to detect movement of the payment card with respect to an individual carrying the payment card in a carrying device; and a smartphone configured to communicate with the payment card, the smartphone including a GPS and a database of purchasing transactions in which the plurality of accounts linked to the payment card have been used in retail establishments, wherein the smartphone is configured to detect when the payment card is in a retail establishment in which one of the plurality of accounts linked to the payment card has been used in a prior purchasing transaction and send a notification to the payment card, and wherein the payment card is configured to activate the haptic feedback mechanism and illuminate one of the plurality of lights upon receipt of the notification from the smartphone.

In accordance with further aspects, one or more non-transitory media storing instructions that, when executed by one or more processors, cause the one or more processors to perform steps including receive, by a payment card from a GPS of a smartphone, an indication that the payment card is in a retail establishment; request, by the payment card, a search of a database for prior instances of any of a plurality of accounts linked to the payment card being used for purchasing transactions in the retail establishment; receive, by the payment card from the smartphone, an indication that one of the plurality of accounts linked to the payment card has been used in one or more purchasing transactions in the retail establishment based on the search of the database; detect, by way of a motion detecting sensor in the payment card, movement of the payment card with respect to an individual carrying the payment card while the payment card is in a carrying device carried by the individual; activate a haptic feedback mechanism in the payment card; and illuminate one of a plurality of lights proximate a peripheral edge of the payment card, the one of a plurality of lights being associated with the one of the plurality of accounts.

By using computing devices and applications to determine when a particular payment card is in a retail establishment, to determine that the particular payment card has been used in a prior purchasing transaction in the retail establishment, and to determine that the user is attempting to retrieve a payment card for use in the retail establishment, the payment card can provide feedback, such as illuminating a light on the card, to indicate to the user that this particular payment card should be used for a purchasing transaction in the retail establishment. Thus, a user can help ensure that they are taking advantage of available benefit and reward programs.

Corresponding apparatus, systems, and computer-readable media are also within the scope of the disclosure. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for providing feedback on a payment card to a user regarding prior use of the payment card for purchasing transactions at a retail establishment, store, merchant, or service provider.

Before discussing these concepts in greater detail, however, several examples of a computing device that may be used in implementing and/or otherwise providing various aspects of the disclosure will first be discussed with respect to FIG. 1.

Figure 1:
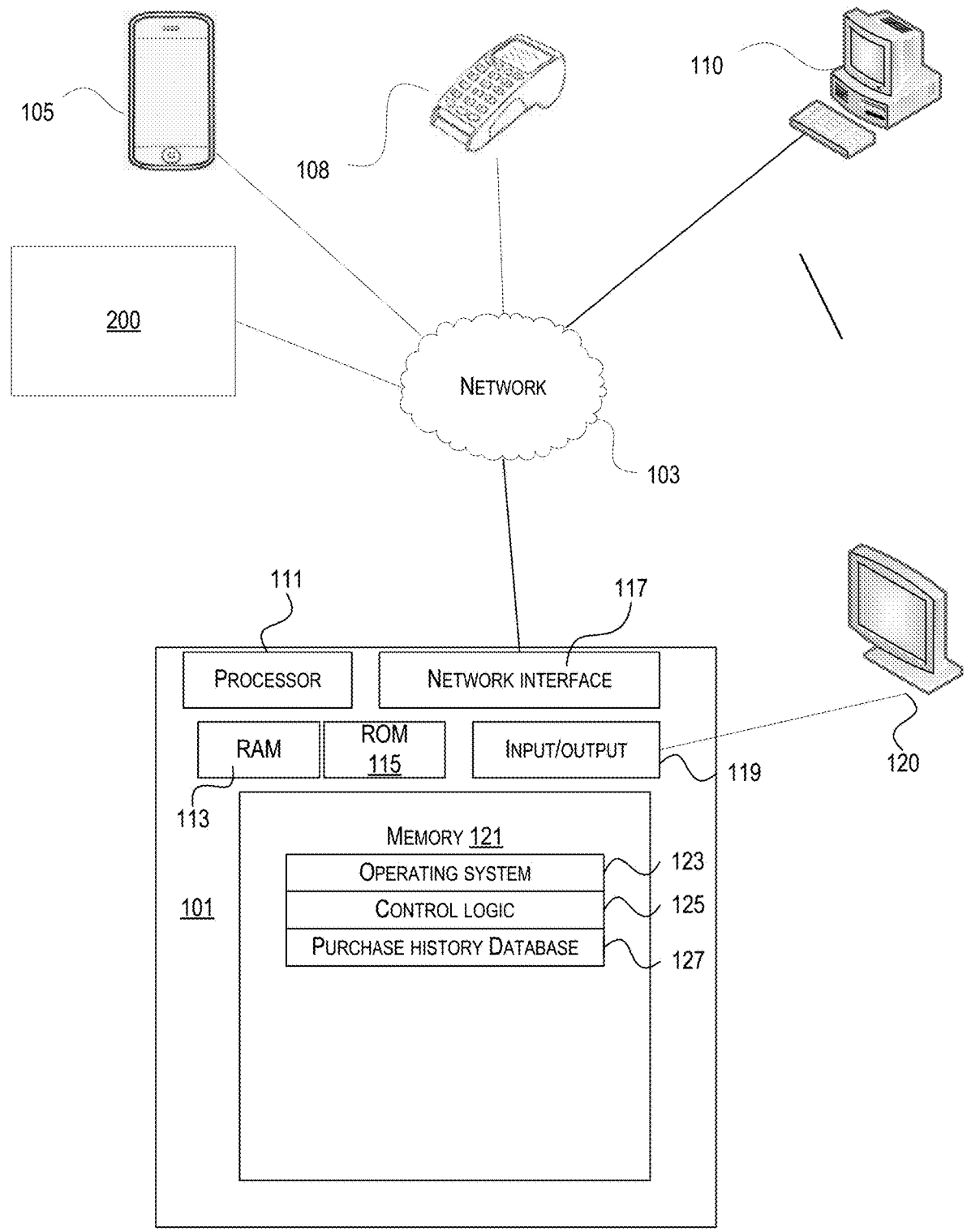
FIG. 1 depicts an example of a computing device that may be used in implementing one or more aspects of the disclosure in accordance with one or more illustrative aspects discussed herein.

FIG. 1 illustrates one example of a computing device 101, or server device, that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

A computing device 101 may, in some embodiments, operate in a standalone environment. In others, computing device 101 may operate in a networked environment. As shown in FIG. 1, various network nodes or devices 105, 108, 110, 200 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 105, 108, 110, 200 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations required by one or more applications stored on the computing device 101. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, and a purchase history database 127. Furthermore, memory 121 may store various other databases and applications depending on the particular use. Control logic 125 may be incorporated in and/or may comprise a linking engine that updates, receives, and/or associates various information stored in the memory 121. In other embodiments, computing device 101 may include two or more of any and/or all of these components (e.g., two or more processors, two or more memories, etc.) and/or other components and/or subsystems not illustrated here.

Devices 105, 108, 110, 200 may have similar or different architecture as described with respect to computing device 101. Those of skill in the art will appreciate that the functionality of computing device 101 (or device 105, 108, 110, 200) as described herein may be spread across multiple data processing devices, for example, to distribute processing load across multiple computers, to segregate transactions based on geographic location, user access level, quality of service (QoS), etc. For example, devices 105, 108, 110, 200 and others may operate in concert to provide parallel computing features in support of the operation of control logic 125 and/or purchase history database 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network to determine when a payment card is in a retail establishment and providing feedback on the payment card to indicate to a user that the payment card has been used for a prior purchasing transaction in the retail establishment.

Figure 2:
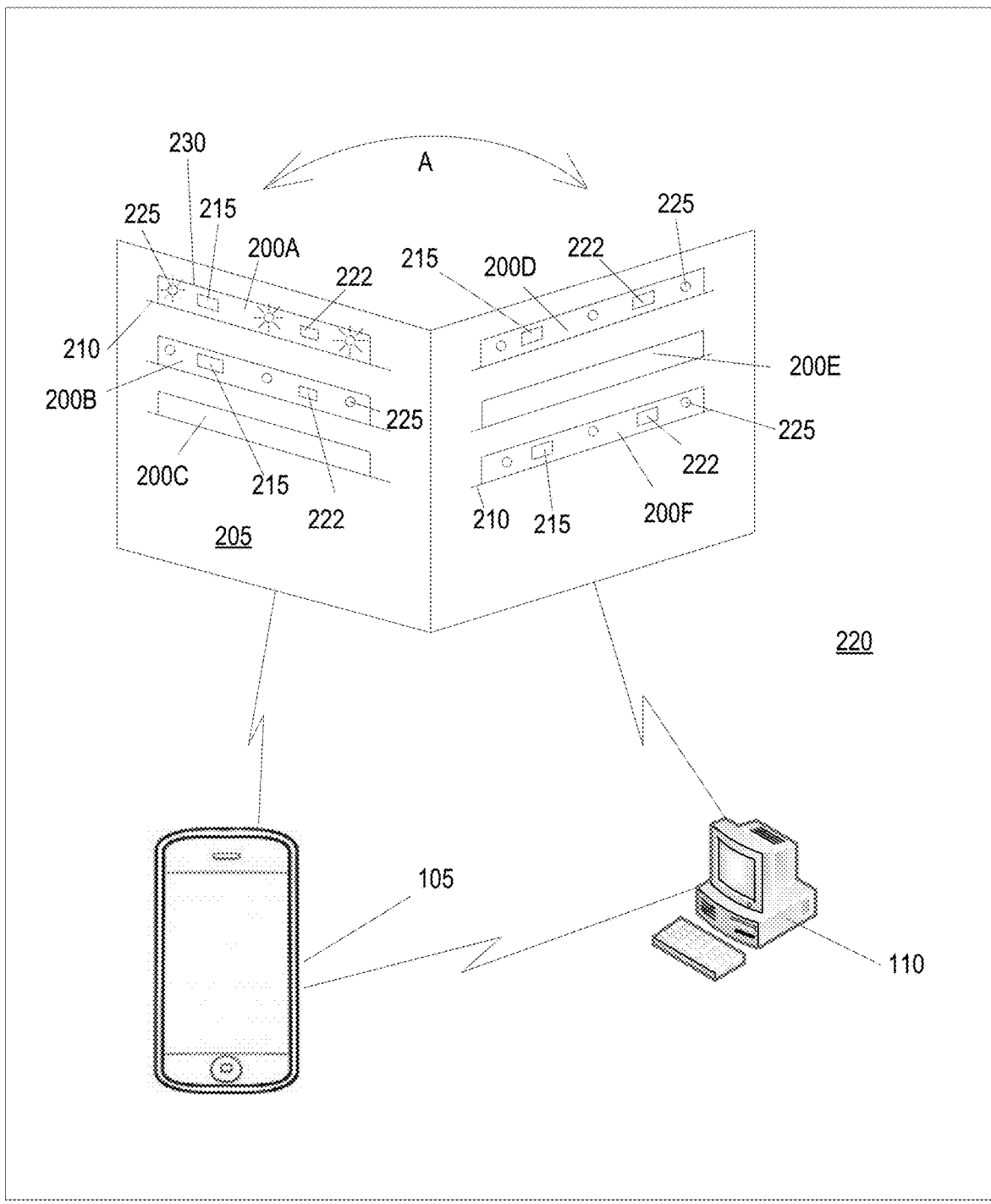
FIG. 2 depicts a schematic diagram of a wallet with payment cards and a smartphone in accordance with one or more illustrative aspects discussed herein.

As illustrated in FIG. 2, a user may carry a plurality of payment cards 200A-F in a carrying device such as a wallet 205. It is to be appreciated that in certain embodiments payment cards 200A-F may be carried in a purse, or any other suitable carrying device. Payment cards 200A-F could be credit cards, debit cards, ATM cards, and/or money access cards ("MAC"). It is to be appreciated that payment cards 200A-F may include a magnetic strip and/or an EMV chip (not shown).

Wallet 205 may include a plurality of slots 210, with each slot 210 holding one of the payment cards 200A-F. One or more of the payment cards 200A-F may include a real-time position tracking system such as a real-time locating system or a GPS device 215 that may be used to detect a location of the payment card 200A-F. For example, GPS device 215 may be used to detect when a payment card 200A-F is at a retail establishment 220, or a store, merchant, or service provider. It is to be appreciated that in certain embodiments, only some of payment cards 200A-F in wallet 205 may include a GPS device 215.

In certain embodiments, a payment card 200A-F may be in communication with a mobile computing device, such as a smartphone 105, for example, that includes a GPS device. In such an embodiment, the location of payment card 200A-F can be detected through the GPS device of smartphone 105 and such information can then be communicated to payment card 200A-F.

Payment card 200A-F may also determine if it has been used in one or more prior purchasing transactions in retail establishment 220 by accessing and searching a purchase history database 127. In certain embodiments, a purchase history database 127 may be maintained on payment card 200A-F itself. In other embodiments, a purchase history database 127 may be maintained on smartphone 105, and smartphone 105 may communicate this information to payment card 200A-F. In further embodiments purchase history database 127 may be maintained on server device 101, which information may then be communicated directly from server device 101 to payment card 200A-F, or from server device 101 to smartphone 105 and then on to payment card 200A-F. In other embodiments, a purchase history database 127 may be maintained on a computing device 110 located in retail establishment 220, which information may then be communicated directly from computing device 110 to payment card 200A-F, or from computing device 110 to smartphone 105 and then on to payment card 200A-F.

Since that particular payment card 200A-F had been used in the retail establishment 220 in the past, the user may want to use that same payment card 200A-F for a new purchasing transaction in retail establishment 220. For example, the user may receive benefits or rewards for using that particular payment card 200A-F in retail establishment 220, and the user would want to be reminded to use the correct payment card 200A-F to take advantage of the benefits or rewards.

Upon detection that a particular payment card 200A-F is in retail establishment 220 and that the particular payment card 200A-F has been used in a prior purchasing transaction in retail establishment 220, payment card 200A-F may be configured to provide feedback to the user that this particular payment card 200A-F should be the payment card they should use for a purchasing transaction.

One or more of payment cards 200A-F in wallet 205 may include a detector 222 that senses movement with respect to the individual carrying the payment card 200A-F. For example, detector 222 may be a light sensor that is activated when the user opens wallet 205, as indicated by arrows A. When wallet 205 is opened, detector 222 is exposed to ambient light, thereby indicating that the user is attempting to select a payment card 200A-F from wallet 205 for a purchase in retail establishment 220. Suitable light sensors for payment cards 200A-F will become readily apparent to those skilled in the art, given the benefit of this disclosure.

In other embodiments, detector 222 may be an accelerometer that detects motion of payment card 200A-F with respect to the user carrying payments cards 200A-F. Thus, when wallet 205 is being removed from a user's pocket, or purse, or when wallet 205 is being opened as depicted by arrows A, the accelerometer will detect this movement and can then activate the feedback device of payment card 200A-F. Since the motion of wallet 205 may provide an indication that the user is trying to access one of the payment cards 200 A-F for a purchasing transaction in retail establishment 220, the user would want feedback on payment card 200A-F to indicate which card should be used.

In other embodiments, detector 222 may be a gyroscope that detects motion of payment card 200A-F with respect to the user carrying payments cards 200A-F. Thus, when wallet 205 is being removed from a user's pocket, or purse, or when wallet 205 is being opened as depicted by arrows A, the gyroscope will detect this movement and can then activate the feedback device of payment card 200A-F. Since the motion of wallet 205 may provide an indication that the user is trying to access one of the payment cards 200 A-F for a purchasing transaction in retail establishment 220, the user would want feedback on payment card 200A-F to indicate which card should be used. Other suitable detectors for detecting motion of a payment card 200A-F with respect to the user carrying payments cards 200A-F will become readily apparent to those skilled in the art, given the benefit of this disclosure.

Payment card 200A-F may also include one or more feedback devices such as lights 225 that can be activated when detector 222 senses movement of payment card 200A-F with respect to the user. The illumination of lights 225 may provide an indication to the user that this particular payment card 200A-F should be used for the purchasing transaction in retail establishment 220.

It is to be appreciated that payment card 200A-F may include one or more lights 225, and that lights 225 may be positioned proximate a peripheral edge 230 of payment card 200A-F so that lights 225 are visible to the user even when payment card 200A-F is seated in a slot 210 of wallet 205. In the illustrated embodiment, payment cards 200A, B, D and F are shown with three lights 225 seated along longitudinal peripheral edges 230 of the cards. It is to be appreciated that fewer or more than three lights 225 may be positioned on payment cards 200A, B, D and F, and that lights 225 can be positioned at any desired location on payment cards 200A, B, D and F.

Thus, when the user opens wallet 205 in which a payment card 200A-F is seated, and payment card 200A-F is located in retail establishment 220 and has been used for a prior purchasing transaction in retail establishment 220, a feedback device is triggered, such as one or more lights 225 that provide feedback to the user that this particular card 200A-F should be used for a new purchasing transaction in retail establishment 220. The illumination of lights 225 provides a quick and easy way for the user to determine which particular payment card 200A-F they should use for a purchasing transaction in retail establishment 220. With the system and payment cards 200A-F providing feedback to the user to indicate the proper payment card 200A-F to use, the user does not have to remember or determine via other means which payment card 200A-F should be used for their purchasing transaction.

Figure 3:
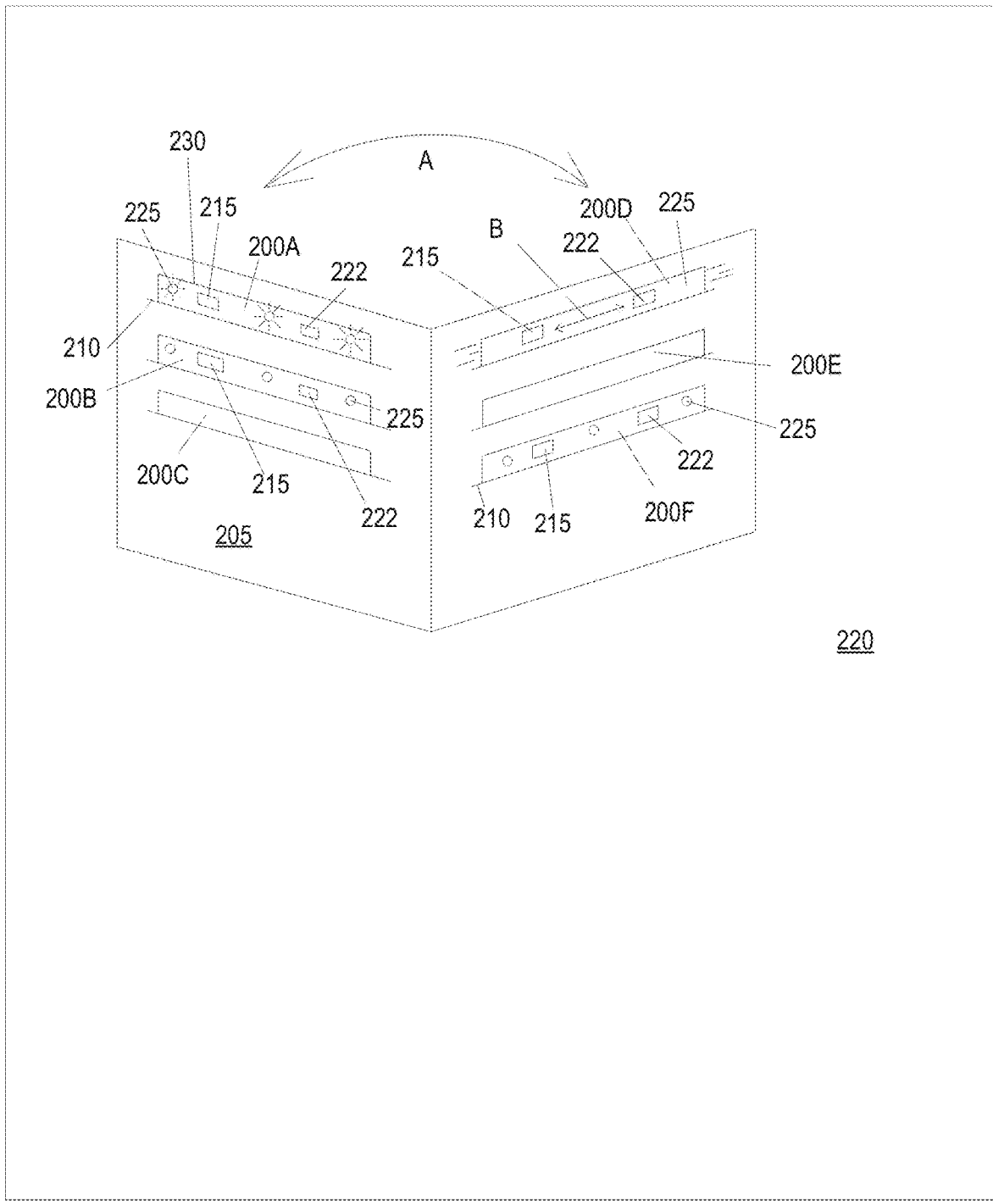
FIG. 3 depicts a schematic diagram of an alternative embodiment of a wallet with payment cards and a smartphone in accordance with one or more illustrative aspects discussed herein.

In another embodiment, as illustrated in FIG. 3, a payment card 200D may provide haptic feedback to the user rather than illuminating lights 225. For example, when detector 222 of payment card 200D detects movement of payment card 200D with respect to the user, the payment card 200D may vibrate, as indicated by arrows B. The vibration of payment card 200D provides an indication to the user that payment card 200D should be used for a purchasing transaction in retail establishment 220. The use of haptic feedback, such as the vibration of payment card 200D may be particularly useful for users that are visually impaired.

It is to be appreciated that in certain embodiments a payment card 200A-F may provide negative feedback to the user if that particular payment card 200A-F is not the appropriate card to be used for the purchasing transaction. For example, payment card 200A may be the card that should be used for a particular purchasing transaction, but the user may inadvertently start to pull payment card 200D from wallet 205. In such an embodiment, payment card 200D may be configured to provide negative feedback to the user, indicating that payment card 200D is not the correct card. For example, payment card 200D may illuminate lights 225 in a manner that indicates to the user that payment card 200D is not the proper payment card. In such an embodiment, lights 225 on payment card 200A, the proper payment card for this purchasing transaction, may be illuminated in green, indicating to the user that this is the proper payment card. When the user starts to pull payment card 200D, the improper payment card in this purchasing transaction, from wallet 205, lights 225 on payment card 200D may be illuminated in red, indicating to the user that this is not the proper payment card.

It is to be appreciated that in other embodiments, the negative feedback to the user may be provided in the form of haptic feedback. For example, payment card 200A, the proper payment card in this purchasing transaction, may vibrate at a first frequency. Payment card 200D, the improper payment card in this purchasing transaction, may vibrate at a second frequency that is different than the first frequency (e.g., a much higher frequency), thereby providing tactile feedback to the user that they are attempting to use the wrong payment card when they start to pull payment card 200D from wallet 205.

It is to be appreciated that the provision of negative feedback may include communication between the different payment cards 200A-F, either directly or through another device, such as server device 101 or smartphone 105.

Figure 4:
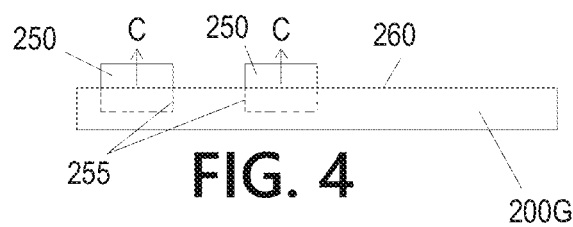
FIG. 4 depicts an elevation view of an alternative embodiment of a payment card in accordance with one or more illustrative aspects discussed herein.

Another exemplary haptic feedback mechanism is illustrated in FIG. 4, in which a payment card 200G may include a plurality of movable elements 250 that are seated in recesses 255 in payment card 200G. Movable elements 250 may be configured to move upwardly away from an exterior surface 260 of payment card 200G after motion of payment card 200G has been detected. In certain embodiments, the plurality of movable elements 250 could comprise Braille characters that would help a visually impaired user to determine that this particular payment card 200G is the card to be removed from the user's wallet 205.

Figure 5:
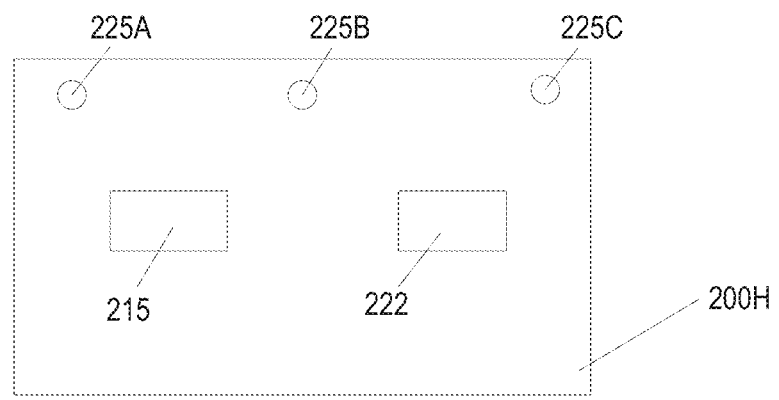
FIG. 5 depicts a plan view of another alternative embodiment of a payment card in accordance with one or more illustrative aspects discussed herein.

In certain embodiments, as illustrated in FIG. 5, a payment card 200H may be linked to a plurality of accounts. For example, payment card 200H could be linked to multiple credit card accounts as well as other types of accounts, such as a debit account, or a Paypal account. In such an embodiment, when GPS device 215 detects that payment card 200H is in retail establishment 220, and detector 222 detects movement of payment card 200H, and payment card 200H obtains confirmation that one of the accounts on payment card 200H has previously been used in a purchasing transaction in retail establishment 220, payment card 200H may provide feedback to the user indicating which particular account had been used in the purchasing transaction.

In such an embodiment, each of the different accounts on payment card 200H could be linked to smartphone 105 or computing device 110 in the manner described above with respect to the individual payment cards 200A-F.

In an exemplary embodiment, as illustrated in FIG. 5, payment card 200H could be linked to three different accounts, and could have three different lights 225A-C, each of which would illuminate if the account associated with that light 225A-C was the account that had been used in the prior transaction. Although the embodiment of FIG. 5 depicts payment card 200H with three accounts, it is to be appreciated that payment card 200H may have any number of different accounts.

In certain embodiments, the location of the individual lights 225A-C on payment card 200H would provide the required notification to the user regarding which account on payment card 200H was used in the prior purchasing transaction, and should be used for the current purchasing transaction. In other embodiments, a different notification could be provided to the user with lights 225A-C. For example, each of lights 225A-C could be illuminated with a different color, which would provide additional user feedback other than just the location of the particular light 225A-C. In other embodiments, lights 225A-C could flash at different intervals to help the user distinguish between the particular accounts. For example, light 225A might be illuminated in a steady, non-flashing manner, light 225B might be illuminated in a steady, flashing manner, and light 225C might be illuminated in a non-steady flashing manner, such as alternating between two flashes and a non-illuminated period.

In other embodiments, rather than different individual lights 225A-C, the different accounts on payment card 200H could illuminate a single light with different colors to provide the indicator to the user which account had been used in the prior purchasing transaction in retail establishment 220. It is to be appreciated that lights on payment card 200H can be configured in any manner that would provide notice to the user which particular account had been used with payment card 200H for a prior purchasing transaction in retail establishment 220.

It is to be appreciated that payment card 200H could provide the user with a distinctive indicator regarding which particular account on payment card 200H had previously been used in retail establishment 220 by way of haptic feedback, rather than lights 225A-C. For example, payment card 200H could vibrate with a pulse of a different duration, or vibrate with a pulse of a different strength, or vibrate with a pulse of a different frequency for the different accounts.

Figure 6:
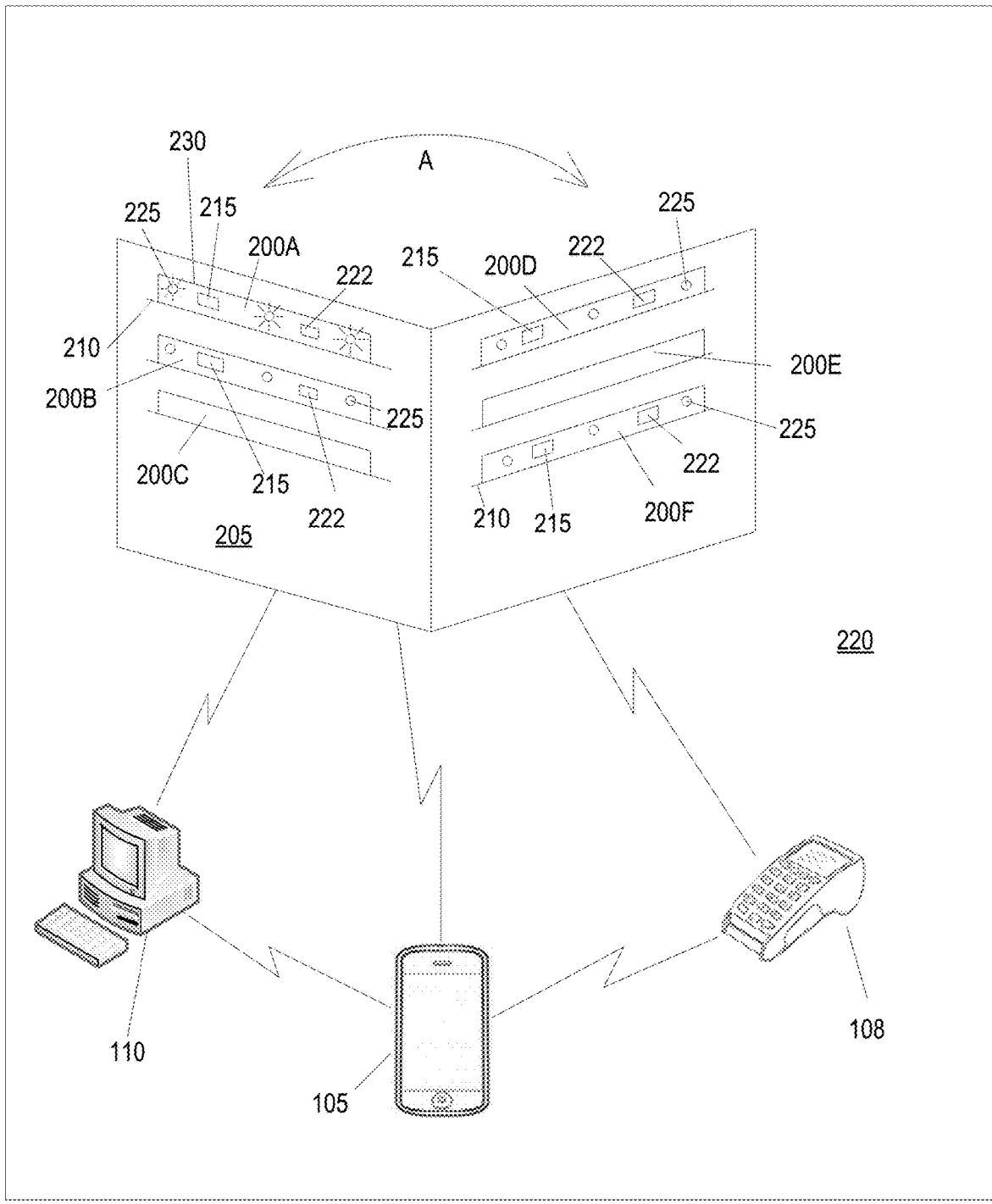
FIG. 6 a schematic diagram of another alternative embodiment of a wallet with payment cards, a smartphone, and a computing device in accordance with one or more illustrative aspects discussed herein.

In certain embodiments, as illustrated in FIG. 6, payments cards 200A-F may detect that they are in retail establishment 220 through a communication with a point of sale ("POS") device 108 or computing device 110, each of which may be located in retail establishment 220. It is to be appreciated that the communication between payment cards 200A-F and POS device 108 and between payment cards 20A-F and computing device 110, or any other device within retail establishment 220, could be via WiFi, Bluetooth, or other communication methods. In certain embodiments, payment cards 200A-F could communicate directly with POS device 108 and/or computing device 110. In other embodiments, payment cards 200A-F and POS device 108 or computing device 110 could communicate with one another through smartphone 105.

Figure 7:
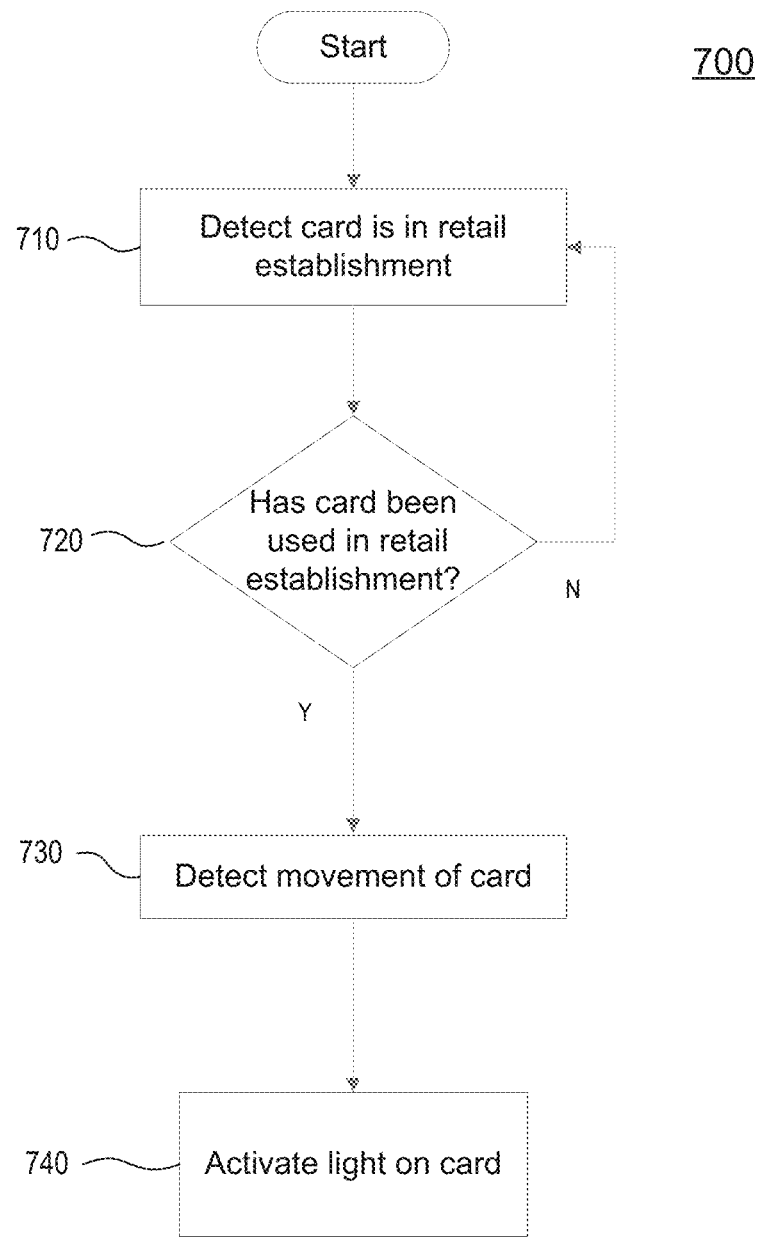
FIG. 7 depicts a flow diagram of an example method in accordance with one or more illustrative aspects discussed herein.

A method 700 of determining whether a payment card has been used in a retail establishment and providing feedback to the user on the card is shown in FIG. 7. At step 710 of FIG. 7, a payment card 200A-F carried by a user in their wallet 205 detects that it is in a retail establishment 220. In certain embodiments, payment card 200A-F may utilize a GPS device 215 on payment card 200A-F to determine when it is in retail establishment 220. In other embodiments, payment card 200A-F may communicate with a smartphone 105 and use a GPS device on smartphone 105 to detect that the payment card is in retail establishment 220.

At step 720, payment card 200A-F determines whether payment card 200A-F has been used in one or more prior purchasing transactions in retail establishment 220. Payment card 200A-F may access a purchase history database that includes prior purchasing transactions. In certain embodiments, a purchase history database may be maintained on payment card 200A-F itself. In other embodiments, a purchase history database may be maintained on smartphone 105, and smartphone 105 may communicate this information to payment card 200A-F. In further embodiments purchase history database 127 may be maintained on server device 101, which information may then be communicated directly from server device 101 to payment card 200A-F, or from server device 101 to smartphone 105 and then on to payment card 200A-F. In other embodiments, a purchase history database may be maintained on a computing device 110 located in retail establishment 220, which information may then be communicated directly from computing device 110 to payment card 200A-F, or from computing device 110 to smartphone 105 and then on to payment card 200A-F.

If it is determined at step 720 that payment card 200A-F has not been used in retail establishment 220, the system returns to step 710. If it is determined at step 720 that payment card 200A-F has been used in retail establishment, payment card 200A-F then detects at step 730 when payment card 200A-F has moved with respect to the individual carrying payment card 200A-F. Payment card 200A-F may use detector 222 to sense movement of payment card 200A-F with respect to the individual carrying the payment card 200A-F. In certain embodiments detector 222 may be a light sensor that is activated when the user opens their wallet 205. In other embodiments, detector 222 may be an accelerometer that detects motion of payment card 200A-F with respect to the user carrying payments cards 200A-F. In further embodiments, detector 222 may be a gyroscope that detects motion of payment card 200A-F with respect to the user carrying payments cards 200A-F.

At step 740, the payment card 200A-F that has previously been used in a purchasing transaction in retail establishment 220 illuminates at least one light 225A-C along a peripheral edge 230 of payment card 200A-F, providing notification to the user that this particular payment card 200A-F should be used for the intended purchasing transaction.

Figure 8:
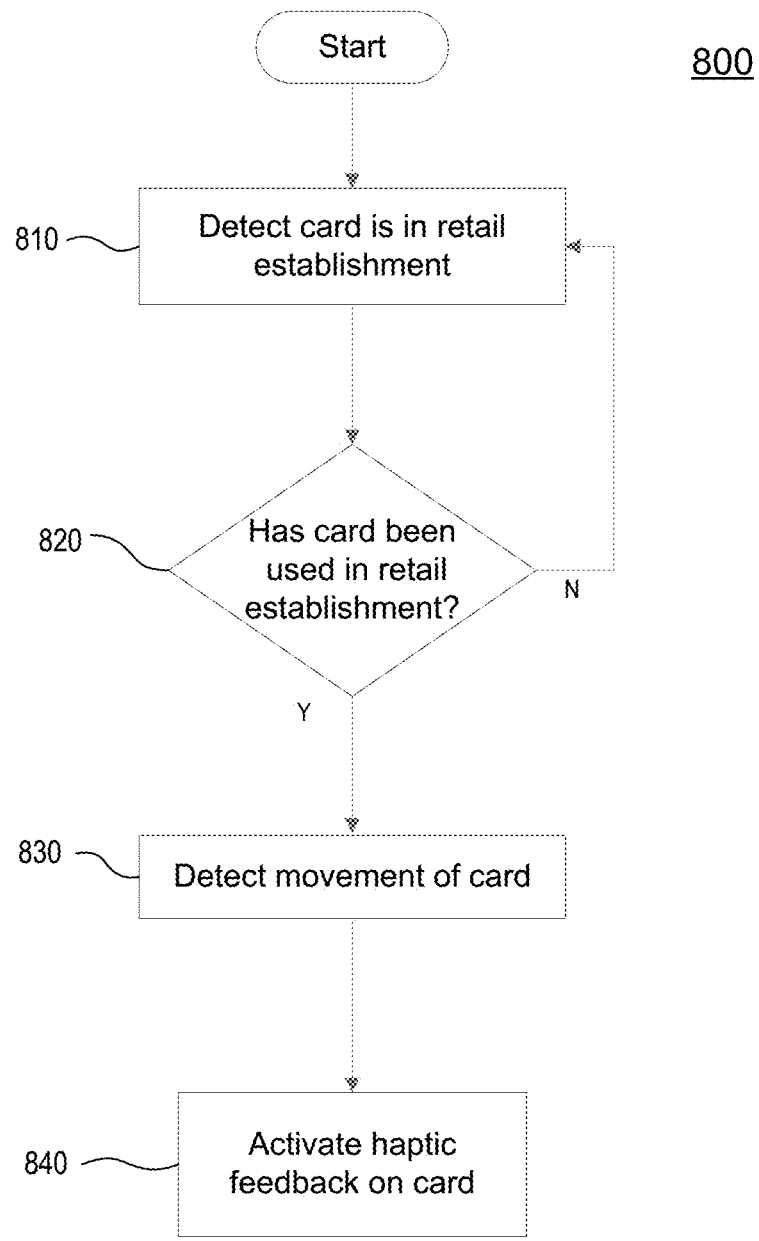
FIG. 8 depicts a flow diagram of an example method in accordance with one or more illustrative aspects discussed herein.

An alternative method 800 of determining whether a payment card has been used in a retail establishment 220 and providing feedback to the user on the card is shown in FIG. 8. At step 810 of FIG. 8, a payment card 200A-F carried by a user in their wallet 205 detects that it is in a retail establishment 220. In certain embodiments, payment card 200A-F may utilize a GPS device 215 on payment card 200A-F to determine when it is in retail establishment 220. In other embodiments, payment card 200A-F may communicate with a smartphone 105 and use a GPS device on smartphone 105 to detect that the payment card is in retail establishment 220.

At step 820, payment card 200A-F determines whether it has been used in one or more prior purchasing transactions in retail establishment 220. Payment card 200A-F may access a purchase history database that includes prior purchasing transactions. In certain embodiments, a purchase history database may be maintained on payment card 200A-F itself. In other embodiments, a purchase history database may be maintained on smartphone 105, and smartphone 105 may communicate this information to payment card 200A-F. In further embodiments purchase history database 127 may be maintained on server device 101, which information may then be communicated directly from server device 101 to payment card 200A-F, or from server device 101 to smartphone 105 and then on to payment card 200A-F. In other embodiments, a purchase history database may be maintained on a computing device 110 located in retail establishment 220, which information may then be communicated directly from computing device 110 to payment card 200A-F, or from computing device 110 to smartphone 105 and then on to payment card 200A-F.

If it is determined at step 820 that payment card 200A-F has not been used in retail establishment 220, the system returns to step 810. If it is determined at step 820 that payment card 200A-F has been used in retail establishment, payment card 200A-F then detects at step 830 when payment card 200A-F has moved with respect to the individual carrying payment card 200A-F. Payment card 200A-F may use detector 222 to sense movement of payment card 200A-F with respect to the individual carrying the payment card 200A-F. In certain embodiments detector 222 may be a light sensor that is activated when the user opens their wallet 205. In other embodiments, detector 222 may be an accelerometer that detects motion of payment card 200A-F with respect to the user carrying payments cards 200A-F. In further embodiments, detector 222 may be a gyroscope that detects motion of payment card 200A-F with respect to the user carrying payments cards 200A-F.

At step 840, the payment card 200A-F that has previously been used in a purchasing transaction in retail establishment 220 provides haptic feedback on payment card 200A-F, providing notification to the user that this particular payment card 200A-F should be used for the intended purchasing transaction. In certain embodiments, the haptic feedback on payment card 200A-F may be a vibration of payment card 200A-F. In other embodiments, the haptic feedback may include the movement of movable elements 250 with respect to a surface 260 of payment card 200A-F. It is to be appreciated that the use of haptic feedback to provide notification to a user may be particularly useful for user's that are visually impaired.

By having payment cards that provide a user with feedback indicating that a particular card should be used for a purchasing transaction in a retail establishment, a user can avoid having to keep track of the prior usage of their payment cards and/or determining which is the best payment card to use for a particular purchasing transaction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   detecting when a payment card is in a retail establishment by establishing communication between the payment card and a real-time position tracking system in a mobile computing device carried by an individual carrying the payment card;
   determining whether one of a plurality of accounts linked to the payment card has been used in one or more prior purchasing transactions in the retail establishment by searching a database of prior purchasing transactions, the database residing on the payment card;
   detecting, by a motion detecting sensor embedded in the payment card, movement of the payment card with respect to the individual carrying the payment card while the payment card is in a carrying device carried by the individual; and
   providing, by the payment card, haptic feedback and visible feedback to the individual carrying the payment card, wherein the visible feedback comprises illuminating one of a plurality of lights positioned proximate at least one peripheral edge of the payment card, the one of a plurality of lights being associated with the one of a plurality of accounts.

2. The method of claim 1, wherein the real-time position tracking system is a GPS.

3. The method of claim 1, wherein the step of detecting when the payment card is in a retail establishment includes the payment card communicating with a POS system in the retail establishment.

4. The method of claim 1, wherein the step of detecting when the payment card is in a retail establishment includes the payment card communicating via WiFi with the retail establishment.

5. The method of claim 1, wherein the real-time position tracking system is a GPS and the step of detecting when the payment card is in a retail establishment includes the payment card communicating with a POS system in the retail establishment via WiFi.

6. The method of claim 1, wherein the individual carrying the payment card carries an additional payment card, and further comprising the step of providing, by the additional payment card, negative feedback when a motion detecting sensor embedded in the additional payment card detects movement of the additional payment card with respect to the individual carrying the additional payment card while the additional payment card is in the carrying device carried by the individual, the negative feedback indicating that the additional payment card has not been used in one or more prior purchasing transactions in the retail establishment.

7. The method of claim 6, wherein the negative feedback comprises haptic feedback and visible feedback, the visible feedback including illuminating one of a plurality of lights positioned proximate at least one peripheral edge of the additional payment card.

8. The method of claim 1, wherein the motion detecting element is one of an accelerometer, a light sensor, a gyroscope, and a magnetometer.

9. The method of claim 1, wherein the step of determining whether the payment card has been used in one or more purchasing transactions in the retail establishment includes communicating with the database on the payment card via the mobile computing device.

10. The method of claim 1, wherein each of the plurality of lights has a color different than a color of each of the other lights of the plurality of lights.

11. The method of claim 1, wherein the haptic feedback comprises a vibration of the payment card.

12. The method of claim 1, wherein the haptic feedback comprises movement of a movable element upwardly away from an exterior surface of the payment card.

13. A system comprising:
   a payment card including a haptic feedback mechanism, a plurality of lights proximate a peripheral edge of the payment card, each of the lights being associated with one of a plurality of accounts to which the payment card is linked and having a color or location on the payment card different than the color or location of each of the remaining lights on the payment card, a sensor to detect movement of the payment card with respect to an individual carrying the payment card in a carrying device, and a database of purchasing transactions in which the plurality of accounts linked to the payment card have been used in retail establishments; and
   a mobile computing device configured to communicate with the payment card, the mobile computing device including a GPS and,
   wherein the mobile computing device is configured to detect when the payment card is in a retail establishment in which one of the plurality of accounts linked to the payment card has been used in a prior purchasing transaction and send a notification to the payment card, and wherein the payment card is configured to activate the haptic feedback mechanism and illuminate one of the plurality of lights upon receipt of the notification from the mobile computing device.

14. The system of claim 13, wherein the sensor is one of an accelerometer, a light sensor, and a gyroscope in the payment card.

15. The system of claim 13, further comprising an additional payment card configured to provide negative feedback when a sensor embedded in the additional payment card detects movement of the additional payment card with respect to the individual carrying the additional payment card while the additional payment card is in the carrying device carried by the individual, the negative feedback indicating that no account linked to the additional payment card has been used in one or more prior purchasing transactions in the retail establishment.

16. The system of claim 15, wherein the negative feedback comprises haptic feedback and visible feedback including illuminating one of a plurality of lights positioned proximate at least one peripheral edge of the additional payment card.

17. One or more non-transitory media storing instructions that, when executed by one or more processors, cause the one or more processors to perform steps comprising:
receive, by a payment card from a GPS of a mobile computing device, an indication that the payment card is in a retail establishment;
search a database on the payment card for prior instances of any of a plurality of accounts linked to the payment card being used for purchasing transactions in the retail establishment;
receive, by the payment card, an indication that one of the plurality of accounts linked to the payment card has been used in one or more purchasing transactions in the retail establishment based on the search of the database;
detect, by way of a motion detecting sensor in the payment card, movement of the payment card with respect to an individual carrying the payment card while the payment card is in a carrying device carried by the individual;
activate a haptic feedback mechanism in the payment card; and
illuminate one of a plurality of lights proximate a peripheral edge of the payment card, the one of a plurality of lights being associated with the one of the plurality of accounts.

18. The one or more non-transitory media of claim 17, wherein the motion detecting sensor is one of an accelerometer and a light sensor in the payment card.

19. The one or more non-transitory media of claim 17, wherein haptic feedback from the haptic feedback mechanism comprises a vibration of the payment card.

20. The one or more non-transitory media of claim 17, wherein each of the plurality of lights has a color different than a color of each of the other lights of the plurality of lights.

* * * * *